Sept. 27, 1966 A. H. HIGGINSON ET AL 3,274,665

MECHANICAL CHIP POSTING MECHANISM

Filed Oct. 6, 1964 2 Sheets-Sheet 1

INVENTORS.
AUSTIN H. HIGGINSON
CLYDE C. ROSHON
BY
John L. Jackson
ATTORNEY

MECHANICAL CHIP POSTING MECHANISM

Filed Oct. 6, 1964 2 Sheets-Sheet 2

United States Patent Office 3,274,665

Patented Sept. 27, 1966

3,274,665

MECHANICAL CHIP POSTING MECHANISM

Austin H. Higginson, Santa Clara, and Clyde C. Roshon, San Jose, Calif., assignors to International Business Machines Corporation, New York, N.Y., a corporation of New York Filed Oct. 6, 1964, Ser. No. 401,935
8 Claims. (Cl. 29—33)

This invention relates to image storage systems in general and more particularly to a method of and mechanism for posting sub-image inserts to a larger image field.

Several types of image storage and retrieval systems have recently evolved. One well known type of image storage and retrieval system employs tape reel storage. While the tape reel type storage system is satisfactory for storing information which does not change or which changes relatively slowly, in those applications wherein the data stored changes rapidly or where updating is required, unit record type image storage has been utilized. The unit record may be a standard punched aperture card or may comprise a discrete length of film containing one or more images, a number of which make up a file. The present invention is designed for use in a unit record type image storage and retrieval system wherein the application dictates that updating or posting to a multi-image record is often necessary.

In a unit record type system wherein updating or posting is required, the basic storage media will be, for instance, a film chip capable of storing multiple images. If the chip is made of a selectively developable film such as any vesicular image type film or the self-developing film of U.S. Patent 2,528,496, it would seem that images could be posted to the chip provided that the original information recorded does not utilize all of the available space on the chip. However, it has been found that there presently exists no known selectively developable film having shelf life characteristics such that it can be utilized in an image storage and retrieval system wherein images can be later added. The shelf life under ideal storage conditions of the above mentioned vesicular image type film is in the order of six months. An additional problem encountered where a selectively developable film is utilized as a film chip is that often in certain applications it is necessary that the entire image area of the chip be copied which, if the entire chip is a photosensitive material, would result in partial exposure of the image areas such that later posting to these areas would be adversely affected. Finally, with respect to a chip composed of a photosensitive material, it has been found that, depending upon the photomaterial utilized, the photomaterial may or may not make a usable chip. Thus, for instance, the chip might not be rigid enough or might not be easily handled or might be brittle in those cases where physical deformation is required.

One way of overcoming the above enumerated shortcomings in an image storage and retrieval system where frequent updating is required is to duplicate on a new chip all of the information on the storage chip which is to be retained and at the same time adding the new information. Such a technique has actually been evaluated. Two problems arose. The first, expense, could perhaps be tolerated, but the second, image degradation from successive exposures, could not.

Thus, ideally, in those applications wherein updating or posting is required, a unit record type storage chip should not be shelf life limited such that, if necessary, several years after original photographic information is stored in the chip, additional updating or posting material can be added. Further, the chip should be made of a material such that copying of the entire image area will not adversely affect any non-image areas. Finally, the chip should be of a material which meets those requirements of the image storage and retrieval system wherein it is stored of rigidity, weight, ease of handling, etc. Likewise, for diverse applications, a wide range of photomaterials should be available for use in the unit record image storage chip.

It is therefore an object of the present invention to provide a novel image storage chip which is ideally suited for use in an application wherein frequent updating or posting is required.

It is another object of the present inveniton to provide a new image storage chip for storing multiple images.

It is another object of the present invention to provide an image storage chip wherein a plurality of image inserts or sub-chips are stored each of which is selectively mechanically removable for replacement by a similar sized insert.

Another object of the present invention is to provide an image storage chip wherein the sub-image areas may comprise a variety of photomaterials on a single chip.

Another object of the present invention is to provide an image storage chip wherein the problem of shelf life is overcome by physical replacement of new sub-image chip inserts.

Another object of the present invention is to provide a new mechanism for inserting sub-chips into the image storage chip and holding such sub-image chips in the chip.

Another object of the present invention is to provide a new mechanism for automatically inserting sub-image chips into the image chip.

Another object of the present invention is to provide a new system of image storage wherein inserts are frictionally held in chips which inserts are cut from a length of film in such a way that concave flexed inserts are presented to the retaining slots of the chips.

Other and further objects and advantages of the invention will be apparent from the following more particular description of the preferred embodiment of the invention as illustrated in the accompanying drawings in which.

Briefly, in the preferred embodiment, a chip having inner, front and back laminations is provided having a plurality of composite, rectangular apertures therein. The aperture in the inner lamination is slightly larger than the other apertures at two opposite extremities thereof whereby retaining slots are formed in the composite apertures into which a film sub-chip insert can be placed. The apertures in the back lamination are slightly smaller than those in the front lamination adjacent the retaining slots whereby a lower ledge is formed. A concave faced punch shears an insert from a reel of film and pushes it down into a carefully positioned chip composite aperture. Since the face of the punch is concave, the insert, as it is sheared from the reel of film, is cammed into a flexed, concave configuration such that application of vacuum will hold the chip during the punch operation. The vacuum is removed while the insert is in operable position with the composite aperture and force is applied such as a plunger or air pressure to snap the film insert into the retaining slot.

Figure 1:
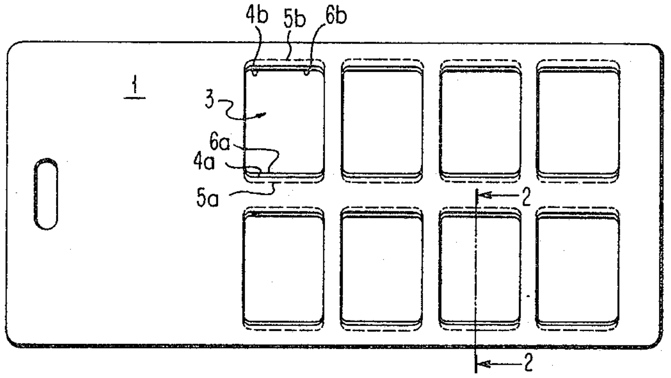
FIG. 1 is a top view of the hereinafter described film chip showing composite apertures for inserts or sub-chips.
Figures 2, 3:
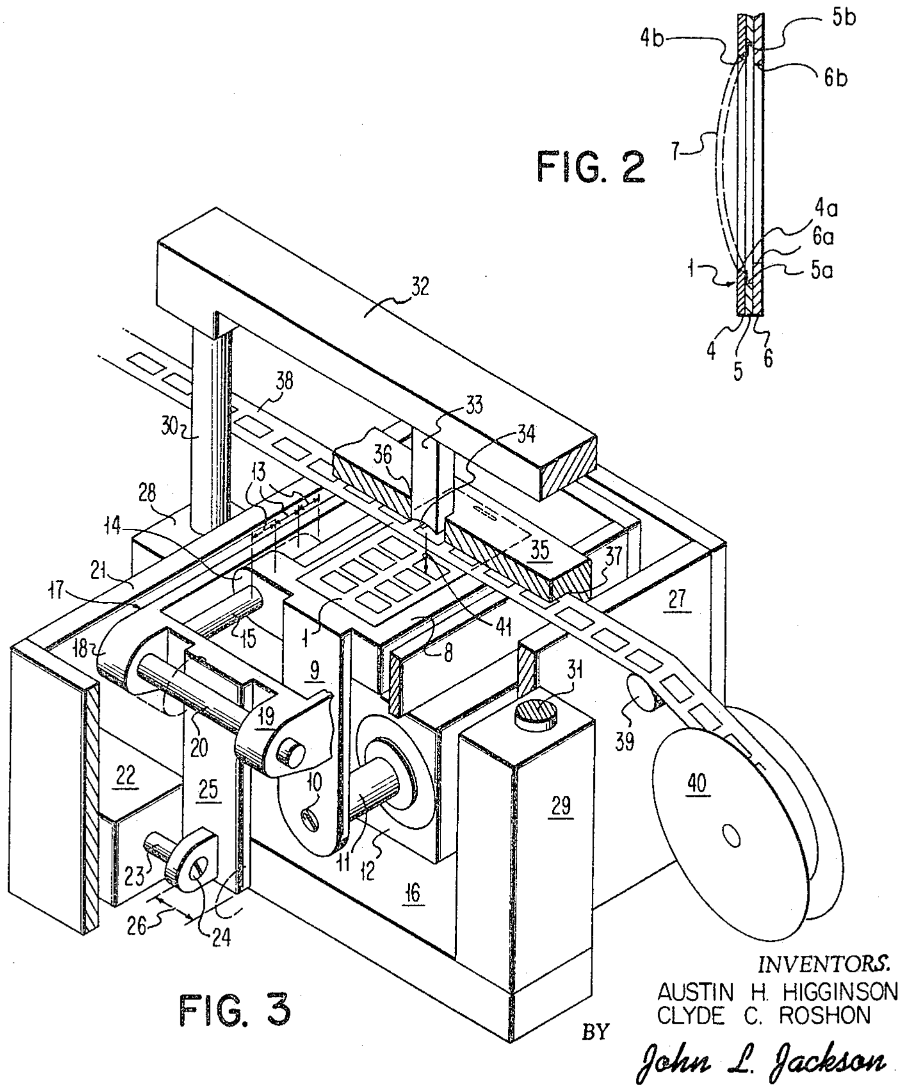
FIG. 2 is an end view along line 2—2 of FIG. 1.
FIG. 3 is a perspective view of the novel cutting and inserting mechanism for inserting sub-chips into the image chip of FIG. 1.

For a more detailed description, refer first to FIG. 1 wherein is shown a composite chip or carrier 1 having, for instance, eight composite apertures 3. As better shown in FIG. 2, which is an end view taken along lines 2—2 of FIG. 1, the chip is laminated. The chip includes front and back laminations 4 and 6 and an inner lamination 5. Each of the laminations 4, 5 and 6 contain eight rectangular apertures placed such that, as shown in FIG. 1, upon the bringing together of the laminations 4, 5 and 6 the apertures will be in alignment to form a composite aperture. As shown in FIGS. 1 and 2, the aperture 3 in the lower lamination 4 is the smallest aperture. The aperture in the upper lamination 6 is next smallest, while the aperture in the inner lamination 5 is the largest. As shown in FIG. 1, the widths of the apertures are equal and the size variation takes place at opposite extremities **4*a*, 5*a*, 6*a* and 4*b*, 5*b* and 6*b*** which, as will hereinafter be more fully discussed, facilitates the snap insertion of the insert which is presented to the chip in a concave flexed configuration.

Reference to FIG. 2 will show clearly that when the laminations are brought together in proper alignment, the lower lamination at each aperture provides a ledge for a chip or insert 7 to bear on during insertion. As shown in FIG. 2, the upper lamination provides a holding action to hold the insert 7 in place after insertion has been accomplished.

While the chip 1, into which an insert 7 may be snapped into place and held by the retaining slot, has been described as being laminar, it will be understood by those skilled in the art that this is not necessary and that the chip could be solid with the retaining slot cut therein or could be molded into this configuration.

Refer next to FIG. 3 wherein is shown a mechanism for punching inserts from a reel or length of film and automatically inserting them into the type of chip illustrated in FIG. 1. In FIG. 3 is shown a chip 1 lying in a recess of a chip or X–Y driven inner carriage 8 with its upper surface flush with the upper surface of the chip or inner carriage 8. The chip carriage 8 has a chip bed extension 9 which is attached by screw 10 to the piston 11 of the chip bed actuator 12. The chip bed actuator 12 may be any sort of electrical or pneumatic actuator which, when actuated, can be caused to selectively move its piston 11 into one of four positions such that the chip bed 8 may be moved as shown by the center line arrows 13 into one of four positions such that, as will hereinafter be explained, the composite apertures of the chip may be positioned in alignment with the punch.

The chip bed 8 includes a chip bed follower 14 which is mounted for slidable movement along the alignment rod 15. The right side of the chip bed 8 rests in sliding contact with and is supported by guides (not shown) attached to the right side of carriage 17. As shown in FIG. 3, the chip bed actuator 12 is mounted on and attached to the frame base 16.

The alignment rod 15 is fixedly secured to an outer carriage 17. The outer carriage 17 includes two followers 18 and 19 which are mounted for movement upon the alignment rod 20 which is fixedly secured to the side frame member 21. The rear of the outer carriage 17 is in sliding contact with the upper surface of the chip bed actuator 12 and a similar surface (not shown) for rear support. Mounted onto the frame member 21 is an outer carriage actuator 22 including a piston 23 which is attached by the mounting screw 24 to the extension 25. The piston 23 is in operable association with the extension 25 such that when the outer carriage actuator 22 is actuated, the outer carriage 17 is caused to move into one of two positions, as illustrated by the center line arrow 26. Both the inner carriage 8 and outer carriage 17 are biased against the pistons 11 and 23 by springs or some other similar biasing arrangement (not shown).

Connected to the frame members 16, 21 and 27 are punch actuators 28 and 29, which, when energized, cause pistons 30 and 31 to move the punch cross arm 32 in a vertical motion. Attached to the punch cross arm 32 is a punch 33 having a concave face 34. The punch 33 is in operable association with a die (not shown) and moves through an opening 36 in the slotted film guide 35 which includes a slot 37 for passage of a length of film 38 therethrough. As shown in FIG. 3, a length of film 38 is mounted for movement past the punch 33 and chip 1 over an idler sprocket 39 and onto takeup reel 40. As depicted in FIG. 3, the inserts to the right of the punch 33 have been removed while the inserts to the left of the punch 33 have not yet been removed. The takeup reel 40 is driven by any conventional means, which is not part of the subject invention.

In operation, an empty chip is placed on the chip bed or inner carriage 8 and the chip bed actuator 12 is energized such that one of the four rows of chip composite apertures are chosen. The outer carriage actuator 22 is likewise actuated so that one of the two columns of composite apertures are in alignment with the path 41 of the punch 33. The punch actuators 28 and 29 are then actuated thus causing the punch 33 to pass down through the slotted film guide 35 and cut out the insert from the film 38 which, at that time, lies on the punch path 41.

Figure 4:
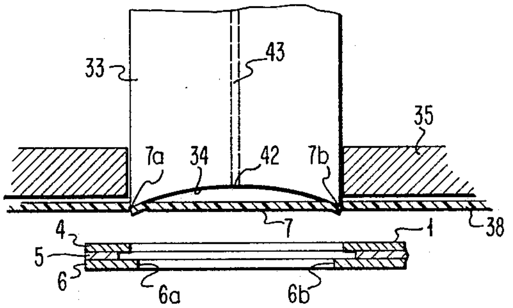
FIG. 4 is a cutaway view showing the cutting action of the punch of the mechanism of FIG. 3 as it begins to punch out a sub-chip.
Figure 7:
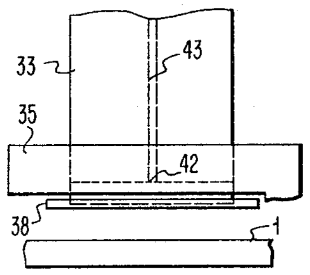
FIG. 7 is a side view of FIG. 4.
Figure 5:
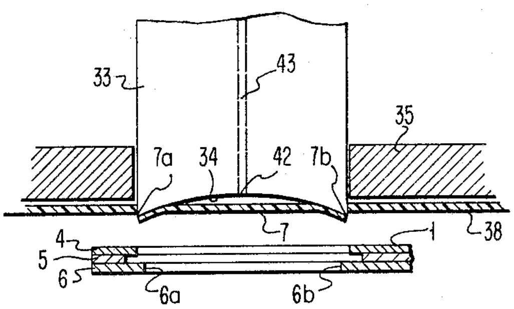
FIG. 5 is a view showing the punch of FIG. 4 in a more advanced manner with the sub-chip almost completely punched out and in a flexed concave configuration.
Figure 8:
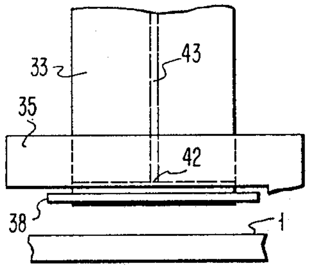
FIG. 8 is a side view of FIG. 5.
Figure 6:
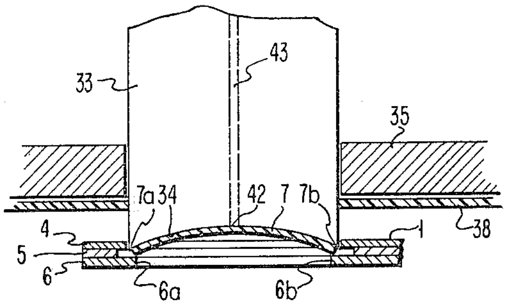
FIG. 6 is a view of the punch of FIG. 4 with the insert completely puncted out and in a flexed concave configuration for inserting into the composite aperature of the film chip.
Figure 9:
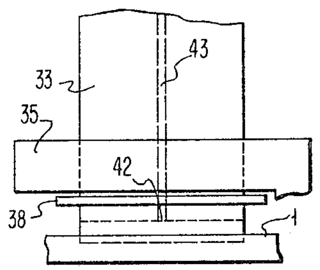
FIG. 9 is a side view of FIG. 6.

For a more detailed description of the operation of the punch 33, refer next to FIGS. 4–9 wherein the punch is shown in various steps as it cuts an insert 7 from a film and positions it for insertion in the chip 1. In FIG. 4 it can be seen that, as the punch comes down onto the film, the extremities **7*a* and 7*b* of the rectangular insert 7 are sheared first, due to the concave face 34 of the punch 33. As shown in FIG. 5, as the punch is lowered still further, the insert 7 is cammed by the concave face of the punch 33. As shown in FIG. 6, as the punch 33 is lowered still further, the camming action continues such that the last part of the insert 7 which is cut from the film 38 is that portion which is adjacent to the vacuum port 42 such that upon application of vacuum, the insert 7 can be held to the face of the punch 33. Then, as shown in FIG. 6, the insert 7 is in alignment with the aperture in the chip 1 and its extremities 7*a* and 7*b* resting on the lower ledge 6*a* and 6*b* such that by application of pressure through the vacuum orifice 42 or by some sort of mechanical plunger 43, the insert 7 can be snapped into the composite aperture of the chip 1**. FIGS. 7–9 are side views depicting, for purposes of understanding, the action of the punch as shown in the steps of FIGS. 4–6, respectively.

It will, of course, be understood that the application of vacuum through the vacuum port 42 would be unnecessary if the placement of the chip is such that, just as the center portion of the insert 7 is sheared from the film strip 38, the extremities of the insert 7 are resting or nearly resting on the lower ledge *6a–6b* of the lamination 6 such that the insert 7 is ready to be snapped into place. The only action necessary then would be some sort of physical force on the upper surface of the insert 7 to cause it to snap into place. It will likewise be recognized by those skilled in the art that while one vacuum port is shown, any number of vacuum ports could be utilized.

In summary, in the preferred embodiment, a chip 1 having inner, front and back laminations is provided having a plurality of composite, rectangular apertures 3 therein. The aperture in the inner lamination is slightly larger than the other apertures at two opposite extremities thereof whereby retaining slots are formed in the composite apertures into which a film sub-chip 7 can be placed. The apertures in the back lamination are slightly smaller than those in the front lamination adjacent the retaining slots whereby a lower ledge is formed. A concave faced punch 33 removes an insert 7 from a reel of film and pushes it down into the carefully positioned chip composite aperture. Since the face of the punch 33 is concave, the insert 7, as it is punched from the reel of film, is cammed into a flexed, concave configuration such that application of vacuum will hold the chip during the punch operation. The vacuum is removed while the insert is in operable position with the composite aperture and force is applied to snap the film insert into the retaining slot.

In the above described manner, there has been provided a unit record type storage chip which is ideally suited for those applications wherein updating or posting is required. This unit record chip which has been provided is not shelf life limited such that, if necessary, several years after the original photographic information is stored on the chip, additional updating or posting material can be added. Further, the inserts in the chip can be made of any type of material such that in special situations where different types of materials are required in the application, this can be effected. Likewise, the rigidity and physical characteristics of the chip are not limited or dependent on the physical characteristics of the photomaterials since the chip is not made of a photomaterial, but is made of any suitable type of plastic or similar material.

It will, of course, be obvious to those skilled in the art that, if an optically clear material is used, the rear of the chip could be windowless providing a measure of additional protection yet allowing removal from the front side for interchange of inserts.

While the invention has been particularly shown and described with reference to a preferred embodiment thereof, it will be understood by those skilled in the art that various changes in the form and details may be made therein without departing from the spirit and scope of the invention.

What is claimed is:

1. In a storage system wherein inserts cut from a length of film are removably mounted in apertures in carriers, the combination comprising:
a carrier having inner, front and back laminations,
at least one composite aperture in said carrier,
the apertures in the inner lamination being slightly larger than the apertures in the front and back laminations at two opposite extremities thereof whereby retaining slots are formed in the composite apertures, and
means for cutting said inserts from said length of film and frictionally mounting them in the retaining slots of said composite apertures.

2. The combination of claim 1 wherein the carrier is a solid chip.

3. In a storage system wherein inserts cut from a length of film are removably mounted in apertures in carriers, the combination comprising:
a carrier having inner, front and back laminations,
at least one composite aperture in said carrier,
the apertures in said inner lamination being slightly larger than the apertures in the front and back laminations of two opposite extremities thereof,
the apertures in said back lamination being slightly smaller than the apertures in said front lamination adjacent the said two extremities of said inner lamination whereby retaining slots and a lower ledge are formed in said composite apertures, and
means for cutting said inserts from said length of film and frictionally mounting them in the retaining slots of said composite apertures.

4. In a storage system wherein inserts cut from a length of film are removably mounted in apertures in carriers, the combination comprising:
a carrier having inner, front and back laminations,
at least one composite aperture in said carrier,
the apertures in said inner lamination being slightly larger than the apertures in the front and back laminations at two opposite extremities thereof,
the apertures in said back lamination being slightly smaller than the apertures in said front lamination adjacent the two extremities of said inner lamination whereby retaining slots and a lower ledge are formed in said composite apertures,
means for cutting said inserts from said length of film comprising a concave faced punch operable to cut first the extremities of the insert which will be inserted into the said retaining slot of said composite aperture to cause said insert just prior to complete separation from said length of film to be cammed into a flexed concave configuration, and
means for inserting said insert into said retaining slot.

5. The combination of claim 3 wherein the carrier is a solid chip.

6. In a storage system wherein inserts cut from a length of film are removably mounted in apertures in carriers, the combination comprising:
a carrier having inner, front and back laminations,
at least one composite aperture in said carrier,
the apertures in said inner lamination being slightly larger than the apertures in the front and back laminations at two opposite extremities thereof,
the apertures in said back lamination being slightly smaller than the apertures in said front lamination adjacent the two extremities of said inner lamination whereby retaining slots and a lower ledge are formed in said composite apertures.
means for cutting said inserts from said length of film comprising a concave faced punch operable to cut first the extremities of the insert which will be inserted into the said retaining slot of said composite aperture to cause said insert just prior to complete separation from said length of film to be cammed into a flexed concave configuration,
vacuum means for holding said insert to said punch face, and
means for pressing said insert into said retaining slot.

7. In a storage system wherein inserts cut from a length of film are removably mounted in apertures in carriers, the combination comprising:
a carrier having inner, front and back laminations,
at least one composite aperture in said carrier,
the apertures in said inner lamination being slightly larger than the apertures in the front and back laminations at two opposite extremities thereof, the apertures in said back lamination being slightly smaller than the apertures in said front lamination adjacent the two extremities of said inner lamination whereby retaining slots and a lower ledge are formed in said composite apertures, means for cutting said inserts from said length of film comprising a concave faced punch operable to cut first the extremities of the insert which will be inserted into the said retaining slot of said composite aperture to cause said insert just prior to complete separation from said length of film to be cammed into a flexed concave configuration, said carrier being positioned such that the extremities of said insert to be inserted into said retaining slot are adjacent to said retaining slots and resting on said lower ledge at the time of complete separation of said insert from said length of film, and means for pressing said insert into said retaining slot.

8. The combination of claim 7 wherein the carrier is a solid chip.

No references cited.

RICHARD H. EANES, Jr., *Primary Examiner.*